United States Patent [19]

Bördner et al.

[11] Patent Number: 4,629,443
[45] Date of Patent: Dec. 16, 1986

[54] INSTALLATION FOR DAMPING TORSIONAL VIBRATIONS IN A GEAR DRIVE, ESPECIALLY BETWEEN THE CRANKSHAFT AND AN OUTPUT SHAFT OF INTERNAL COMBUSTION ENGINES

[75] Inventors: Rolf Bördner, Emling; Heinz Hege, Munich; Wolfgang Nehse, Haag; Thomas Ochott, Munich, all of Fed. Rep. of Germany

[73] Assignee: Bayerische Motoren Werke Aktiengesellschaft, Munich, Fed. Rep. of Germany

[21] Appl. No.: 653,021

[22] Filed: Sep. 21, 1984

[30] Foreign Application Priority Data

Sep. 23, 1983 [DE] Fed. Rep. of Germany ....... 3334562

[51] Int. Cl.$^4$ .......................... F16D 3/14; F16F 15/12
[52] U.S. Cl. ........................................ 464/74; 74/411; 464/180
[58] Field of Search ............... 74/411, 574; 192/106.1; 464/74, 76, 83, 178, 180; 123/90.31; 474/94

[56] References Cited

U.S. PATENT DOCUMENTS

| | | | |
|---|---|---|---|
| 1,974,356 | 9/1934 | Edwards | 464/74 |
| 2,961,892 | 11/1960 | Spannhake | 74/574 |
| 3,265,172 | 8/1966 | Atsumi et al. | 464/83 X |
| 3,631,953 | 1/1972 | Snoy | 464/74 X |

FOREIGN PATENT DOCUMENTS

| | | |
|---|---|---|
| 937319 | 1/1956 | Fed. Rep. of Germany . |
| 1450096 | 7/1970 | Fed. Rep. of Germany . |
| 1921099 | 10/1970 | Fed. Rep. of Germany . |
| 2539424 | 10/1980 | Fed. Rep. of Germany . |

*Primary Examiner*—Stuart S. Levy
*Assistant Examiner*—Daniel P. Stodola
*Attorney, Agent, or Firm*—Barnes & Thornburg

[57] ABSTRACT

An installation for damping torsional vibrations in a gear drive, especially between the crankshaft and an output shaft of internal combustion engines, in which a gear wheel on the output shaft is connected with the output shaft by a friction clutch and an elastic coupling connected operatively in parallel thereto. To obtain a space-saving and operationally reliable structural unit to be assembled in a simple manner from preassembled units, the elastic coupling includes an inner coupling half and an outer coupling half each having radially directed webs as rotary abutments of interposed rubber elements; the outer coupling half is rigidly connected with the gear wheel and the friction clutch is arranged between the end faces of the gear wheel and the webs of the outer coupling half and is held centered by a prestressed spring element between these end faces up to assembly on the output shaft.

29 Claims, 1 Drawing Figure

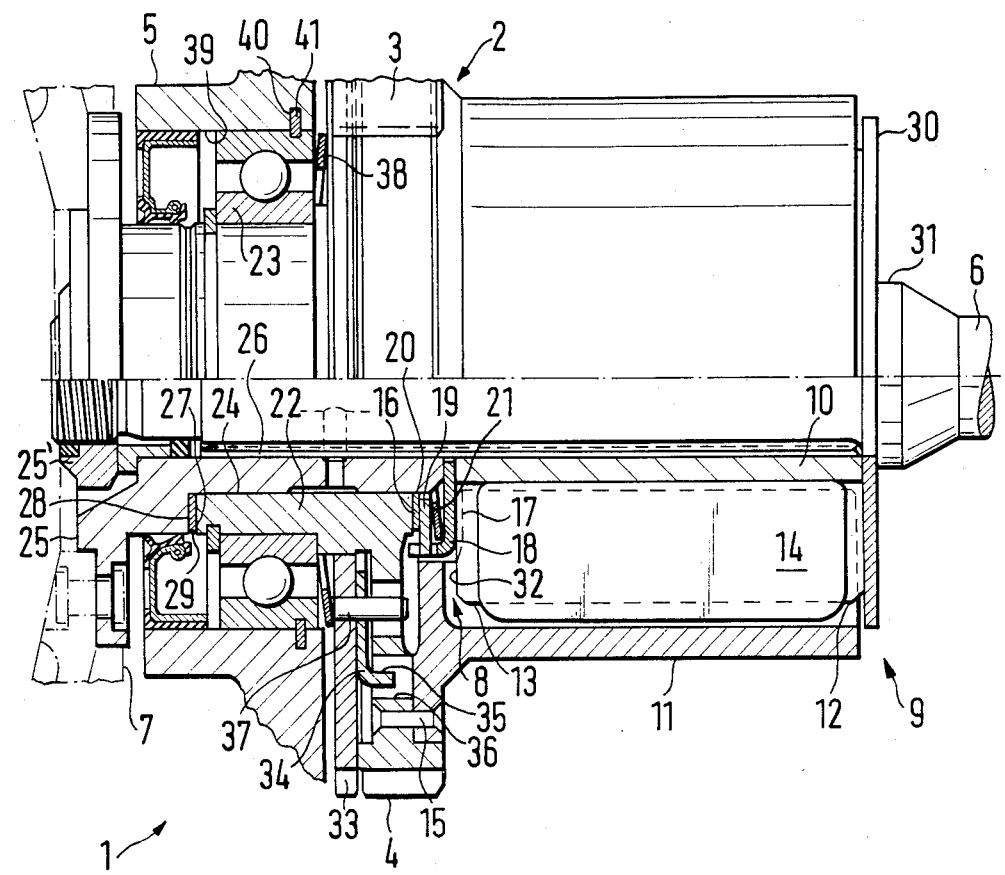

INSTALLATION FOR DAMPING TORSIONAL VIBRATIONS IN A GEAR DRIVE, ESPECIALLY BETWEEN THE CRANKSHAFT AND AN OUTPUT SHAFT OF INTERNAL COMBUSTION ENGINES

The present invention relates to an installation for damping torsional vibrations in a gear drive, especially between the crankshaft and an output shaft of internal combustion engines as disclosed in the German Pat. No. 25 39 424.

In this prior art installation the output shaft serves as balancing shaft for reaction moments during rotational speed changes of the engine and as auxiliary drive shaft for a generator which serves as balancing mass. By reason of the operating conditions resulting therefrom the friction clutch is constructed as main drive connection and the elastic coupling serves as damping means, when the transmission torque of the friction clutch is exceeded. The friction clutch therefor involves a large space requirement and high structural expenditures. The elastic coupling is built into the drive gear. This prior art installation is therefore not suited for the transmission of the entire output torque of the engine onto the output shaft with simultaneous damping of torsional vibrations because the prior art arrangement would then require impractically large dimensions. Furthermore, with this prior art installation the individual structural components such as the gear, a part of the elastic coupling and the friction clutch are arranged individually on the balancing shaft and are combined into a functional unit. This arrangement is costly in its assembly.

It is therefore the object of the present invention to provide an installation for the output of the engine, especially of the crankshaft of an internal combustion engine, to an output shaft for a series-connected change-speed transmission or another aggregate, in which at least the gear wheel, a part of the elastic coupling and the friction clutch form a structural and functional unit adapted to be preassembled which is space-saving, cost favorable and operationally reliable as well as simple to assemble.

The underlying problems are solved according to the present invention in that the elastic coupling is formed of an inner coupling half and of an outer coupling half with webs each as rotary abutments for interconnected elastic elements, in that the outer coupling half is rigidly connected with the gear wheel and in that friction clutch is arranged between end faces of the gear wheel and the webs of the outer coupling half. A compact construction with low structural expenditures and favorable properties for the assembly is achieved in this manner, in particular the friction clutch can be held coaxially to the axis of the shaft by a prestressed spring element. As a result thereof, a preassembled unit including at least the outer clutch half, the gear wheel and the friction clutch can be assembled on the output shaft without special expenditure. A space-saving and operationally reliable installation is attained in that the elastic coupling transmits the output torque and the friction clutch dampens the torsional vibrations. This can be achieved if the elastic coupling transmits predominantly the torque between the gear wheel and the output shaft, if the friction clutch serves as friction damper for torsional vibrations between gear wheel and output shaft, and if the friction clutch includes an entrainment member nonrotatable with the output shaft and coordinated to the webs of the outer coupling half at the end face thereof, a thrust ring and a friction ring facing the end face of the gear wheel as well as a cup spring arranged between entrainment member and thrust ring which is prestressed during the axial assembly of gear wheel and outer coupling half. A friction clutch simple in construction is achieved thereby in combination with this functional division, which is of particularly short construction in the axial direction. The structural length realized thereby can be utilized in an advantageous manner for the configuration of the rubber elements between the inner and outer coupling half, whereby the external dimensions of the outer coupling half can be kept small.

A structurally simple arrangement of the installation is achieved in that according to the present invention the installation is axially clamped together in the end area of the output shaft between a shaft collar and a separate flange bushing of a connecting arrangement of the output shaft. This arrangement further entails a non-rotatable clamped mounting for the entrainment member of the friction clutch so that a simple constructive design without separate form-locking connecting elements results for the entrainment member which drives the spring loaded thrust ring. Additionally, the cup spring of the friction clutch is automatically and correspondingly prestressed between entrainment member and thrust ring by the axial clamping action of the installation by a shoulder of the flange bushing abutting end-face at the hub. Moreover, the rotatable bearing support of the installation in a housing bore which is separated centrally by means of a shaft bearing on the hub of the gear wheel entails the advantage that the installation can be combined with the output shaft and the further connecting part outside of the housing into a larger assembly unit.

Furthermore, the gear wheel of the installation according to the present invention may be combined with a restraining or bracing gear wheel of known type for achieving a gear drive that operates without play. In an internal combustion engine having a crank drive with high non-uniformities and low flywheel mass, for example, a change-speed transmission with comparably large flywheel mass may be coupled to the crankshaft by way of the installation in accordance with the present invention if constructed as mentioned hereinabove without the danger that the teeth of the installation are mechanically overloaded by occurring torsional vibrations and that noises are produced by abutment changes of the tooth flanks.

Finally, for the simplification of the assembly of the restraining gear wheel, a slotted spring ring which is prestressed in the circumferential direction, may be arranged at the gear wheel. The restraining gear wheel which is offset in the circumferential direction with its teeth with respect to the teeth of the gear wheel, is drivingly connected with the spring ring by means of a fitting or dowel pin. As a result thereof, the extent of stressing is determined prior to the engagement of the gear wheel into the counter gear and does not have to be produced only by additional rotation respectively stressing of the spring ring prior to the meshing engagement of the gear wheels.

These and other objects, features and advantages of the present invention will become more apparent from the following description when taken in connection with the accompanying drawing which shows, for purposes of illustration only, one embodiment in accordance with the present invention, and wherein:

The single FIGURE is an elevational view, partially in axial cross section, through an installation in accordance with the present invention for damping torsional vibrations between a crankshaft and an output shaft of an internal combustion engine.

Referring now to the single figure of the drawing, this figure illustrates an installation generally designated by reference numeral 1 for damping torsional vibrations in a gear drive generally designated by reference numeral 2 which includes gear wheels 3 and 4. The gear wheel 3 is thereby arranged on a crankshaft of an internal combustion engine (not shown). An output shaft 6 is arranged in the housing 5 of the internal combustion engine in parallel to the crankshaft. The output shaft 6 is pperatively connected at one end by way of a flywheel 7 and a separating clutch (not shown) with a change-speed transmission and at the other end thereof with auxiliary aggregates.

The gear wheel 4 of the installation 1 is force-lockingly connected with the output shaft 6 by way of a friction clutch 8 and is non-rotatably connected with the output shaft 6 by an elastic coupling generally designated by reference numeral 9 which is connected in parallel thereto. The elastic coupling 9 consists of an inner coupling half 10 and of an outer coupling half 11 which include each radially directed webs 12 and 13, respectively, as rotary abutments for interconnected rubber elements 14. The outer coupling half 11 is rigidly connected with the gear wheel 4 preferably by rivets 15. Prior to the connection of these two structural parts 4 and 11, the friction clutch 8 is arranged between the end faces 16 and 17 of the gear wheel 4 and the webs 12 of the outer coupling half 11. The friction clutch 8 includes an entrainment member 18 coordinated endface to the webs 12 of the outer coupling half 11, a thrust ring 19 and a friction ring 20 facing the end face 16 of the gear wheel 4. The cup spring 21 is arranged between the entrainment member 18 and the thrust ring 19. This cup spring 21 is prestressed preliminary during the axial assembly of gear wheel 4 and outer coupling half 11 for the rigid connection by means of the rivets 15 and as a result thereof the friction clutch 8 is held centered until assembly of the preassembled unit on the output shaft 6.

For purposes of achieving a space-saving and operationally reliable installation 1, the friction clutch 8 serves as friction damper for torsional vibrations between gear wheel 4 and output shaft 6, whereby the elastic coupling 9 transmits predominantly the torque between gear wheel 4 and output shaft 6. Additional structural length for the rubber cushions 14 of the elastic coupling 9 which transmit the torque, is achieved by means of the friction clutch which can be built relatively short in the axial direction, so that the outer coupling half 11 can be kept small in its outer diameter.

The gear wheel 4 includes a hub 22 which carries a roller-bearing 23 at the outer circumference thereof on the side of the gear wheel opposite the elastic coupling 9. The hub 22 further includes a slide bearing bore 24 for a flange bushing 25 coaxially arranged between gear wheel 4 and output shaft 6, which is non-rotatably connected with the flywheel 7 of an output clutch (not shown). The flange bushing 25, in its turn, is non-rotatably connected with the output shaft 6 by a spline shaft profile 26. Furthermore, the hub 22 of the gear wheel 4 which is angularly movable relative to the flange bushing 25, includes end faces 16 and 27 as friction surfaces. The end face 16 thereby cooperates with the friction ring 20 of the friction clutch 8 and the end face 27 with a further friction ring 29 of the friction clutch 8 arranged between the hub 22 and a shoulder 28 of the flange bushing 25.

The inner coupling half 10 of the elastic coupling 9 serving for the transmission of the driving torque is non-rotatably connected with the output shaft 6 by way of the spline shaft profile 26. Furthermore, the inner coupling half 10 abuts against a collar 31 of the output shaft 6 under interposition of a disc 30 and for purposes of axially securing in the opposite direction is held on the output shaft 6 by means of a tight or interference fit with the spline shaft profile 26. The preassembled unit formed by the output shaft 6 and the inner coupling half 10 is assembled with the other unit including gear wheel 4, outer coupling half 11 and friction clutch 8 under interposition of the loosely arranged rubber elements 14. The axial assembly of the two units is completed with the abutment of the entrainment member 18 at the inner coupling half 10, whereby the entrainment member 18 additionally abuts at the end faces 17 of the webs 12 of the outer coupling half 11. The gear wheel 4 and the outer coupling half 11 are centered with respect to the output shaft 6 by way of the flange bushing 25 which engages with a sliding fit into the spline shaft profile 26 of the output shaft 6, until assembly of the installation 1 in the housing 5. Furthermore, the flange bushing 25 extends through the hub 22 of the gear wheel 4 with such an axially projecting length that the flange bushing abuts against the end face 32 of the inner coupling half 10 by way of the interposed entrainment member 18. Such an axial distance is thereby selected between the end face 32 of the inner coupling half 10 and shoulder 28 of the flange bushing 25 that the entrainment member 8 is lifted off from the end faces 17 of the webs 12 of the outer coupling half 11 during axial clamping together by means of the clamping nut 25' and is held fast against rotation between the flange bushing 25 and the end face 32 of the inner coupling half 11 by the clamping action of the mounting. The entrainment member 18 is moved away from the end faces 17 of the webs 12 by an axial displacement of the gear wheel 4 together with the outer coupling half 11 by the shoulder 28 of the flange bushing 25. As a result of this displacement of the gear wheel 4 and of the outer coupling half 11 in the direction toward the disc 30 respectively the shaft collar 31, the cup spring 21 of the friction clutch 8 is at the same time prestressed to the final value. The friction clutch 8 and the elastic coupling 9 are so constructed and dimensioned that the friction clutch 8 dampens resonances which occur at low frequencies and large amplitudes whereas the rubber elements 14 of the elastic coupling 9 transmit the driving torque and dampen high frequencies of the torsional vibrations.

Finally, for achieving a gear drive 2 operating free of play, a restraining gear wheel 33 angularly movably arranged on the hub 22 is coordinated to the gear wheel 4. The constraining gear wheel 33 is non-rotatably but elastically connected with the gear wheel 4 by way of a slotted spring ring 34. The spring ring 34 includes at one end an angularly bent portion 35 for the support in the circumferential direction within an aperture 36 of the gear wheel 4. With its other end the spring ring 34 prestressed in the circumferential direction is secured or fixed at the gear wheel 4 by a fitting pin. The restraining gear wheel 33 is drivingly connected with the springy end of the spring ring 34 having the angularly bent end portion 35 by way of a further fitting pin 37. The restraining gear wheel 33 is positioned with its teeth offset in the circumferential direction with respect to the teeth of the gear wheel 4 by way of the driving connection. The restraining gear wheel 33 is axially secured at the gear wheel 4 by way of a cup spring 38 supported at the inner race of the roller bearing 23.

The installation 1 is supported with the output shaft 6 and further devices arranged at the ends thereof externally in a bore 39 of the housing 5 by way of the roller bearing 23. The housing 5 is divided in a center plane of the bore 39 and includes a circumferential groove 40, into which engages a radial flange 41 arranged at the outer race of the roller bearing.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An installation for damping torsional vibrations in a gear drive, comprising an output shaft, a gear wheel, at least two drive paths between the gear wheel and the output shaft comprising friction clutch means operatively connecting the gear wheel with the output shaft in a force-locking connection and an elastic coupling means operatively connecting the gear wheel with the output shaft in an elastic rotary connection in parallel with the friction clutch means, the elastic coupling means including an inner coupling half and an outer coupling half each having webs as rotary abutments for interposed elastic elements, the outer coupling half being rigidly connected with the gear wheel, the friction clutch means being arranged between end faces of the gear wheel and of the webs of the outer coupling half, the friction clutch means including an entrainment member coodinated end-face to the webs of the outer coupling half, a thrust ring and a friction ring facing the end face of the gear wheel as well as a cup spring arranged between the entrainment means and the thrust ring, said cup spring being prestressed preliminary during the axial assembly of the gear wheel and the outer coupling half.

2. An installation according to claim 1, wherein the gear wheel includes a hub which carries a shaft bearing means at its outer circumference on the side of the gear wheel opposite the elastic coupling means, the shaft bearing means being supported externally in a housing means, a slide bearing bore provided in the hub, a flange bushing means in said slide bearing bore partially supporting said gear wheel, said flange bushing means being arranged coaxially between the gear wheel and the output shaft and being nonrotatably connected with the output shaft but angularly movable with respect to the gear wheel, the hub including end faces serving as friction surfaces, one of the friction surfaces cooperating with the friction ring and the other friction surface cooperating with a further friction ring arranged between the hub and a shoulder of the flange bushing means.

3. An installation according to claim 2, wherein the inner coupling half is nonrotatably connected with the output shaft and abuts against a collar of the output shaft, and wherein the outer coupling half, the gear wheel and the friction clutch means being preassembled and centered on the output shaft by means of the flange bushing means axially extending through the hub of the gear wheel, and the flange bushing means abutting against the end face of the inner coupling half by way of the interposed entrainment means, whereby such an axial distance is selected between the end face of the inner coupling half and the shoulder of the flange bushing means that with an axial clamping together the entrainment means is arranged at a distance from the end faces of the webs of the outer coupling half and is secured against rotation between the flange bushing means and the end face of the inner coupling half.

4. An installation according to claim 3, wherein the inner coupling half is nonrotatably connected with the output shaft by way of a spline shaft profile means.

5. An installation according to claim 4, wherein a clamping nut is operable to axially clamp together the parts includihg the flange bushing means, the entrainment means and the inner clutch half.

6. An installation according to claim 3, further comprising a restraining gear wheel coordinated to the first-mentioned gear wheel on the side of the shaft bearing means, said restraining gear wheel being angularly movably arranged on the hub, a slotted spring ring means operatively connecting the restraining gear wheel with the first-mentioned gear wheel, and a cup spring means supported at the inner race of the shaft bearing means for axially securing the restraining gear.

7. An installation according to claim 6, wherein the spring ring means includes at one end thereof an angularly bent portion for the support in the circumferential direction within an aperture of the first-mentioned gear wheel, the spring ring means which is prestressed in the circumferential direction being secured at its other end at the first-mentioned gear wheel by a fitting pin, and the restraining gear wheel being in driving connection with the elastic end having the angularly bent portion.

8. An installation according to claim 7, wherein the gear drive is between a crankshaft and an output shaft of an internal combustion engine.

9. An installation for damping torsional vibrations in a gear drive, comprising an output shaft, a gear wheel, friction clutch means operatively connecting the gear wheel with the output shaft in a force-locking connection and an elastic coupling means operatively connecting the gear wheel with the output shaft in an elastic rotary connection in parallel with the friction clutch means, the elastic coupling means including an inner coupling half and an outer coupling half each having webs as rotary abutments for interposed elastic elements, the outer coupling half being rigidly connected with the gear wheel, the friction clutch means being arranged between end faces of the gear wheel and of the webs of the outer coupling half, wherein the elastic coupling means predominately transmit the torque between the gear wheel and the output shaft, the friction clutch means serving as friction damper for torsional vibrations between the gear wheel and the output shaft and including an entrainment means coordinated end-face to the webs of the outer coupling half, a thrust ring and a friction ring facing the end face of the gear wheel as well as a cup spring arranged between the entrainment means and the thrust ring, said cup spring being prestressed preliminary during the axial assembly of the gear wheel and the outer coupling half.

10. An installation for damping torsional vibrations in a gear drive, comprising an output shaft, a gear wheel, friction clutch means operatively connecting the gear wheel with the output shaft in a force-locking connection and an elastic coupling means operatively connecting the gear wheel with the output shaft in an elastic rotary connection in parallel with the friction clutch means, the elastic coupling means including an inner coupling half and an outer coupling half each having webs as rotary abutments for interposed elastic elements, the outer coupling half being rigidly connected with the gear wheel, and the friction clutch means being arranged between end faces of the gear wheel and of the webs of the outer coupling half, wherein the gear wheel includes a hub which carries a shaft bearing means at its outer circumference on the side of the gear wheel opposite the elastic coupling means, the shaft bearing means being supported externally in a housing means, a slide bearing bore provided in the hub, a flange bushing means in said slide bearing bore, said flange bushing means being arranged coaxially between the gear wheel and the output shaft and being nonrotatably connected with the output shaft but angularly movable with respect to the gear wheel, the hub including end faces serving as friction surfaces, one of the friction surfaces cooperating with a friction ring of the friction clutch means and the other friction surface cooperating with a further friction ring arranged between the hub and a shoulder of the flange bushing means.

11. An installation according to claim 10, wherein the inner coupling half is nonrotatably connected with the output shaft and abuts against a collar of the output shaft, and wherein the outer coupling half, the gear wheel and the friction clutch means are preassembled and centered on the output shaft by means of the flange bushing means axially extending through the hub of the gear wheel, and the flange bushing means abutting against the end face of the inner coupling half by way of the interposed entrainment means, whereby such an axial distance is selected between the end face of the inner coupling half and the shoulder of the flange bushing means that with an axial clamping together the entrainment means is arranged at a distance from the end faces of the webs of the outer coupling half and is secured against rotation between the flange bushing means and the end face of the inner coupling half.

12. An installation according to claim 10, further comprising a restraining gear wheel coordinated to the first-mentioned gear wheel on the side of the shaft bearing means, said restraining gear wheel being angularly movably arranged on the hub, a slotted spring ring means operatively connecting the restraining gear wheel with the first-mentioned gear wheel, and a cup spring means supported at the inner race of the shaft bearing means for axially securing the restraining gear.

13. An installation according to claim 12, wherein the spring ring means includes at one end thereof an angularly bent portion for the support in the circumferential direction within an aperture of the first-mentioned gear wheel, the spring ring means which is prestressed in the circumferential direction being secured at its other end at the first-mentioned gear wheel by a fitting pin, and the restraining gear wheel being in driving connection with the elastic end having the angularly bent portion.

14. An installation for damping torsional vibrations, comprising a gear wheel, an output shaft, friction clutch means for force-lockingly connecting the gear wheel with the output shaft, elastic coupling means connected operatively in parallel to the friction clutch means and torsionally elastically connecting the gear wheel with the output shaft, the torque being transmitted substantially exclusively by the elastic coupling means while the friction clutch means is constructed substantially only as friction damper means for torsional vibrations between the gear wheel and the output shaft, the gear wheel including a hub portion having end faces constructed as friction surfaces of two halves of the friction clutch means, the hub portion carrying on an externally cylindrically annular surface a bearing means which is supported externally thereof in a housing means, the elastic coupling means adjoining the gear wheel axially opposite the bearing means, the coupling means including an outer coupling half rigidly connected with the gear wheel and an inner coupling half operatively connected with the outer coupling half by way of elastic elements, the inner coupling half being form-lockingly connected with the output shaft extending through the gear wheel and the inner coupling half, said friction clutch means including a friction ring, a thrust ring, a cup spring and an entrainment means nonrotatable with the output shaft for the thrust ring which are arranged between the elastic coupling means and the friction surface of the friction clutch means facing the elastic coupling means following one another in the axial direction starting from the gear wheel, a flange bushing means partially supporting said gear wheel and arranged coaxially betweeen the gear wheel and the output shaft, said flange bushing means being angularly movably connected with the gear wheel by way of a cylindrical slide bearing means and by way of a shoulder facing a friction surface of the gear wheel with interconnected friction ring and being form-lockingly connected with the output shaft.

15. An installation according to claim 14, wherein the gear wheel and the outer coupling half are rigidly connected with each other, the rigid connection prestressing preliminary the cup spring of the friction clutch means during the assembly prior to the installation of the inner coupling half, whereby the entrainment means is axially supported at the end face of the webs of the outer coupling half, and said entrainment means being axially clamped in and fixed against rotation during the final assembly between the end faces of the inner coupling half and the flange bushing means.

16. An installation according to claim 14, wherein the gear drive is between a crankshaft and an output shaft of an internal combustion engine.

17. An installation for damping torsional vibrations in a gear drive, comprising an output shaft and a gear wheel having at least two drive paths between the gear wheel and the output shaft, the improvement comprising that the first of said drive paths utilizes an elastic coupling means having fixed connection means to the gear wheel and output shaft and providing an elastic rotary driving connection for the transmission of torque between the gear wheel and the output shaft and the second of said drive paths utilizes a frictional clutch means serving as a frictional damper for torsional vibrations between the gear wheel and the output shaft, the first drive path utilizing the elastic coupling means is in parallel with the second drive path utilizing the frictional clutch means and wherein the gear wheel includes a hub which carries a shaft bearing means at its outer circumference on the side of the gear wheel opposite the elastic coupling means, the shaft bearing means being supported externally in a housing means, a slide bearing bore provided in the hub, a flange bushing means partially supporting said gear wheel in said slide bearing bore, said flange bushing means being arranged coaxially between the gear wheel and the output shaft and being nonrotatably connected with the output shaft but angularly movable with respect to the gear wheel, the hub including end faces serving as friction surfaces, one of the friction surfaces cooperating with the friction ring and the other friction surface cooperating with a further friction ring arranged between the hub and a shoulder of the flange bushing means.

18. A device for the damping of torsional vibrations in a gear wheel drive between the crankshaft and an output shaft of internal combustion engines, comprising a gear wheel being actuated by adherence with the output shaft by means of a friction clutch means and being actuated torsionally with the output shaft by means of a paralleled elastic coupling means, wherein the friction clutch means acts as a frictional damper for torsional vibrations between the gear wheel and the output shaft and the elastic coupling means acts to predominantly transmit torque between the gear wheel and the output shaft, and wherein the elastic coupling means consists of an inside coupling half connected with the output shaft in a rotationally stable manner and an outside coupling half rigidly connected with the gear wheel, said halves having respective webs as torsional stops for inserted elastic elements, and wherein the friction clutch means includes an entrainment member, a thrust ring, and a friction ring and cup spring arranged between the entrainment member and the thrust ring, the friction clutch means being arranged between front surfaces of the gear wheel and the webs of the outside coupling half, the cup spring of the friction clutch means being prestressed by the rigid connection of the gear wheel and outside coupling half.

19. An installation according to claim 18, wherein the gear wheel includes a hub which carries a shaft bearing means at its outer circumference on the side of the gear wheel opposite the elastic coupling means, the shaft bearing means being supported externally in a housing means, a slide bearing bore provided in the hub, a flange bushing means in said slide bearing bore partially supporting said gear wheel, said flange bushing means being arranged coaxially between the gear wheel and the output shaft and being nonrotatably connected with the output shaft but angularly movable with respect to the gear wheel, the hub including end faces serving as friction surfaces, one of the friction surfaces cooperating with the friction ring and the other friction surface cooperating with a further friction ring arranged between the hub and a shoulder of the flange bushing means.

20. An installation according to claim 19, wherein the inner coupling half is nonrotatably connected with the output shaft and abuts against a collar of the output shaft, and wherein the outer coupling half, the gear wheel and the friction clutch means being preassembled and centered on the output shaft by means of the flange bushing means axially extending through the hub of the gear wheel, and the flange bushing means abutting against the end face of the inner coupling half by way of the interposed entrainment means, whereby such an axial distance is selected between the end face of the inner coupling half and the shoulder of the flange bushing means that with an axial clamping together the entrainment means is arranged at a distance from the end faces of the webs of the outer coupling half and is secured against rotation between the flange bushing means and the end face of the inner coupling half.

21. An installation according to claim 20, wherein the inner coupling half is nonrotatably connected with the output shaft by way of a spline shaft profile means.

22. An installation according to claim 21, wherein a clamping nut is operable to axially clamp together the parts including the flange bushing means, the entrainment means and the inner clutch half.

23. An installation according to claim 20, further comprising a restraining gear wheel coordinated to the first-mentioned gear wheel on the side of the shaft bearing means, said restraining gear wheel being angularly movably arranged on the hub, a slotted spring ring means operatively connecting the restraining gear wheel with the first-mentioned gear wheel, and a cup spring means supported at the inner race of the shaft bearing means for axially securing the restraining gear.

24. An installation according to claim 23, wherein the spring ring means includes at one end thereof an angularly bent portion for the support in the circumferential direction within an aperture of the first-mentioned gear wheel, the spring ring means which is prestressed in the circumferential direction being secured at its other end at the first-mentioned gear wheel by a fitting pin, and the restraining gear wheel being in driving connection with the elastic end having the angularly bent portion.

25. An installation according to claim 24, wherein the gear drive is between a crankshaft and an output shaft of an internal combustion engine.

26. An installation according to claim 18, wherein the gear wheel includes a hub which carries a shaft bearing means at its outer circumference on the side of the gear wheel opposite the elastic coupling means, the shaft bearing means being supported externally in a housing means, a slide bearing bore provided in the hub, a flange bushing means in said slide bearing bore partially supporting said gear wheel, said flange bushing means being arranged coaxially between the gear wheel and the output shaft and being nonrotatably connected with the output shaft but angularly movable with respect to the gear wheel, the hub including end faces serving as friction surfaces, one of the friction surfaces cooperating with a friction ring of the friction clutch means and the other friction surface cooperating with a further friction ring arranged between the hub and a shoulder of the flange bushing means.

27. An installation according to claim 26, further comprising a restraining gear wheel coordinated to the first-mentioned gear wheel on the side of the shaft bearing means, said restraining gear wheel being angularly movably arranged on the hub, a slotted spring ring means operatively connecting the restraining gear wheel with the first-mentioned gear wheel, and a cup spring means supported at the inner race of the shaft bearing means for axially securing the restraining gear.

28. An installation according to claim 27, wherein the spring ring means includes at one end thereof an angularly bent portion for the support in the circumferential direction within an aperture of the first-mentioned gear wheel, the spring ring means which is prestressed in the circumferential direction being secured at its other end at the first-mentioned gear wheel by a fitting pin, and the restraining gear wheel being in driving connection with the elastic end having the angularly bent portion.

29. An installation according to claim 26, wherein the inner coupling half is nonrotatably connected with the output shaft and abuts against a collar of the output shaft, and wherein the outer coupling half, the gear wheel and the friction clutch means are presassembled and centered on the output shaft by means of the flange bushing means axially extending through the hub of the gear wheel, and the flange bushing means abutting against the end face of the inner coupling half by way of the interposed entrainment means, whereby such an axial distance is selected between the end face of the inner coupling half and the shoulder of the flange bushing means that with an axial clamping together the entrainment means is arranged at a distance from the end faces of the webs of the outer coupling half and is secured against rotation between the flange bushing means and the end face of the inner coupling half.

* * * * *